United States Patent
Lee et al.

(10) Patent No.: US 7,961,749 B2
(45) Date of Patent: Jun. 14, 2011

(54) SIGNALING METHOD AND SYSTEM FOR CHANNEL SWITCHING IN A WIRELESS LOCAL AREA NETWORK

(75) Inventors: Sung-Won Lee, Seoul (KR); Rakesh Taori, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 666 days.

(21) Appl. No.: 11/505,992

(22) Filed: Aug. 18, 2006

(65) Prior Publication Data
US 2007/0042797 A1    Feb. 22, 2007

Related U.S. Application Data

(60) Provisional application No. 60/709,118, filed on Aug. 18, 2005.

(30) Foreign Application Priority Data

Jun. 8, 2006   (KR) ......................... 10-2006-0051434

(51) Int. Cl.
*H04L 12/28* (2006.01)
(52) U.S. Cl. ....................................................... 370/431
(58) Field of Classification Search ........... 370/431–463
See application file for complete search history.

(56) References Cited

U.S. PATENT DOCUMENTS

| | | | |
|---|---|---|---|
| 7,039,068 B1 * | 5/2006 | Halasz | 370/473 |
| 7,054,293 B2 * | 5/2006 | Tiedemann et al. | 370/335 |
| 7,251,232 B1 * | 7/2007 | Meier | 370/338 |
| 2002/0181426 A1 | 12/2002 | Sherman | |
| 2004/0264504 A1 | 12/2004 | Jin | |
| 2006/0133342 A1 * | 6/2006 | Zeng | 370/346 |
| 2006/0165114 A1 * | 7/2006 | Diepstraten et al. | 370/445 |
| 2007/0002887 A1 * | 1/2007 | Benveniste | 370/437 |

FOREIGN PATENT DOCUMENTS

| | | |
|---|---|---|
| EP | 1587254 | 3/2005 |
| WO | WO 2004-091145 | 10/2004 |

OTHER PUBLICATIONS

IEEE Std 802.11-1997, Part 11 : Wireless LAN Medium Access Control (MAC) and Physical Layer (PHY) specification, Jun. 26, 1997, The Institute of Electrical and Electronics Engineers, Inc.*
Surong Zeng, Provisional application No. 60/63764, A Polling Scheme to Improve the MAC Efficiency in Bottleneck Points and Provide QoS Support in Multi-hop Wireless Mesh Networks, Dec. 17, 2004.*

* cited by examiner

*Primary Examiner* — Derrick W Ferris
*Assistant Examiner* — Mang Yeung
(74) *Attorney, Agent, or Firm* — NSIP Law

(57) ABSTRACT

A signaling method and apparatus for channel switching in a WLAN are provided. In the signaling method and apparatus, a data transmission channel is allocated to a receiver and a transmitter. A channel index is set to indicate the allocated channel in a duration field. A current channel is switched to the data transmission channel indicated by the channel index.

21 Claims, 10 Drawing Sheets

SIGNALING METHOD AND SYSTEM FOR CHANNEL SWITCHING IN A WIRELESS LOCAL AREA NETWORK

CROSS-REFERENCE TO RELATED PATENT APPLICATION

This application claims the benefit under 35 U.S.C. §119(e) of an application filed in the US Patent and Trademark Office on Aug. 18, 2005 and assigned Ser. No. 60/709,118, and an application filed in the Korean Patent and Trademark Office on Jun. 8, 2006 and assigned Serial No. 2006-51434, the entire disclosure of which is hereby incorporated by reference.

BACKGROUND OF THE INVENTION

1. Field of the Invention

The present invention relates generally to a signaling method for facilitating channel switching in a Wireless Local Area Network (WLAN). More particularly, the present invention relates to a signaling method and system for indicating and selecting a channel suitable for a data transmission whereby the suitable channel is indicated by means of a channel index embedded in the existing duration field.

2. Description of the Related Art

Multi-channel Media Access Control (MAC) can increase throughput through simultaneous transmission on orthogonal channels. To facilitate full utilization of the available channels, switching capability is required. Compatibility with existing Stations (STAs) is not ensured if channel switching is carried out using new control frames. This is because these new control frames, which are not known to the existing WLAN nodes, may result in the Network Allocation Vector (NAV) not being updated by the existing nodes causing a malfunction and/or require a hardware modification for implementing the multi-channel function.

Request-To-Send (RTS) and Clear-To-Send (CTS) frames are defined in an Institute of Electrical and Electronics Engineers (IEEE) 802.11 WLAN. As control frames are handled in real time, these types of control frames can be used as a mean to achieve immediate channel switching. However, there is no room left for signaling a destination channel in the format of the control frame specified in the IEEE 802.11 WLAN standard.

As described above, if an RTS frame or a CTS frame is configured to indicate a data transmission channel in a WLAN capable of supporting multiple channels, network efficiency can be increased and immediate channel switching can be provided. Furthermore, and more importantly the existing STAs can still recognize the indicated data transmission channel without necessarily requiring significant hardware modification.

Accordingly, there is a need for an improved system and method for providing a signaling for channel switching, wherein the channel index, indicating which destination to switch to, can be embedded in the duration fields of RTS and CTS frames.

SUMMARY OF THE INVENTION

An aspect of exemplary embodiments of the present invention is to address at least the above problems and/or disadvantages and to provide at least the advantages described below. An exemplary embodiment of the present invention provides a signaling method for channel switching, in which channel indexes are set in the Duration fields of RTS and CTS frames.

An exemplary embodiment of the present invention provides a signaling method for channel switching in a WLAN. A data transmission channel is allocated to a receiver and a transmitter. A channel index is set to indicate the allocated channel in a duration field. A current channel is switched to the data transmission channel indicated by the channel index.

An exemplary embodiment of the present invention also provides a signaling method for channel switching in a transmitter in a WLAN. The transmitter sets a channel index to indicate a data transmission channel in a duration field and transmits an RTS frame including the duration field to a receiver.

According to a further aspect of an exemplary embodiment of the present invention, in a signaling method for channel switching in a receiver in a WLAN, the receiver receives an RTS frame including a channel index from a transmitter. The receiver sets a CTS frame to indicate whether channel switching is to be performed and transmits the CTS frame to the transmitter.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will become more apparent from the following detailed description taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

RTS Frame and CTS Frame

Figure 1A:
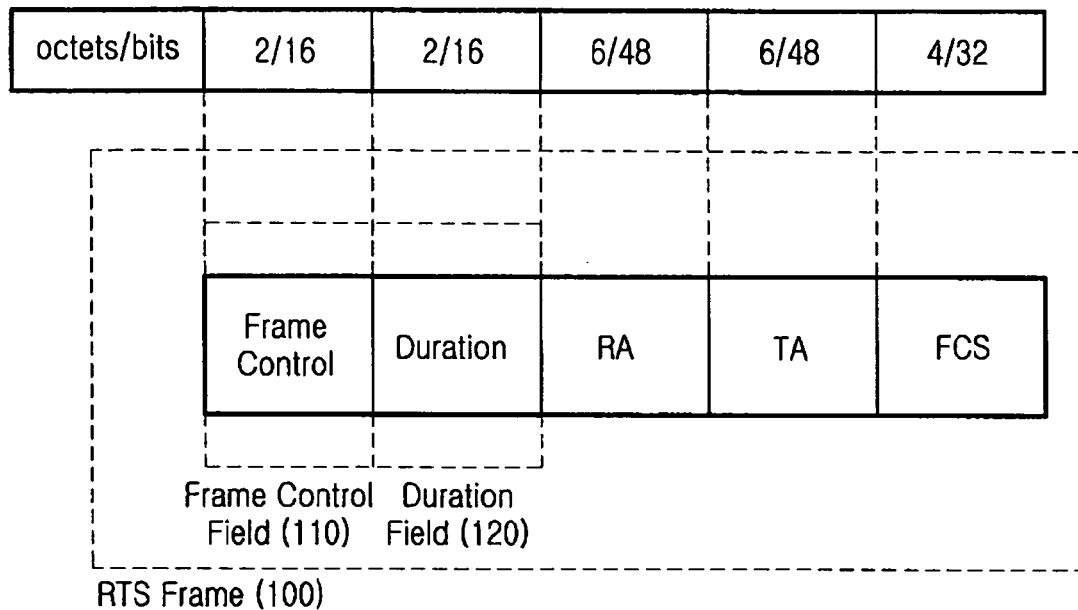
FIG. 1A illustrates the structure of an RTS.
Figure 1B:
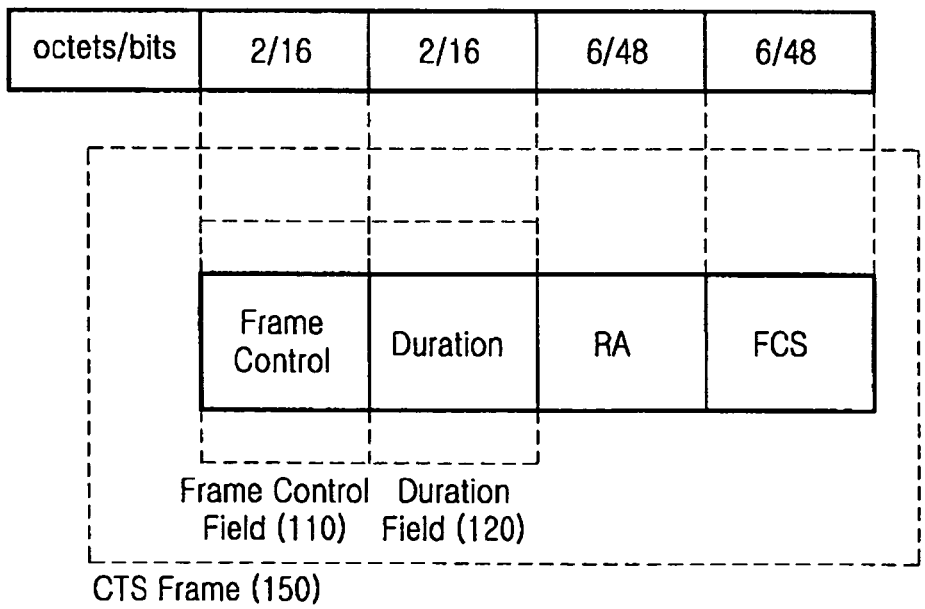
FIG. 1B illustrates the structure of a CTS.

With reference to FIGS. 1A and 1B, the structures of the RTS and CTS frames will be described. Existing RTS and CTS frames have no space remaining for indicating a destination channel. In contrast, an exemplary embodiment of the present invention sets a method to embed a destination channel index in the already existing duration field in the RTS and CTS frames, to thereby facilitate indication of the channel to switch to. The RTS and CTS frames are control frames. When a destination channel is indicated using these frames to enable channel switching, then the channel can be switched to the destination channel indicated by the channel index immediately following the completion of the transmission and reception of the control frames.

FIG. 1A and FIG. 1B illustrates the structure of the RTS and CTS control frames according to the IEEE 802.11 WLAN standard. In accordance with an exemplary embodiment of the present invention, data is delivered on a channel switched using a Frame Control field 110 and a Duration field 120 in the RTS frame. Since the channel index can be embedded in the duration field, no additional space is required for indicating a destination channel; an existing STA can implement this scheme without major hardware modification.

Frame Control Field

Figure 2:
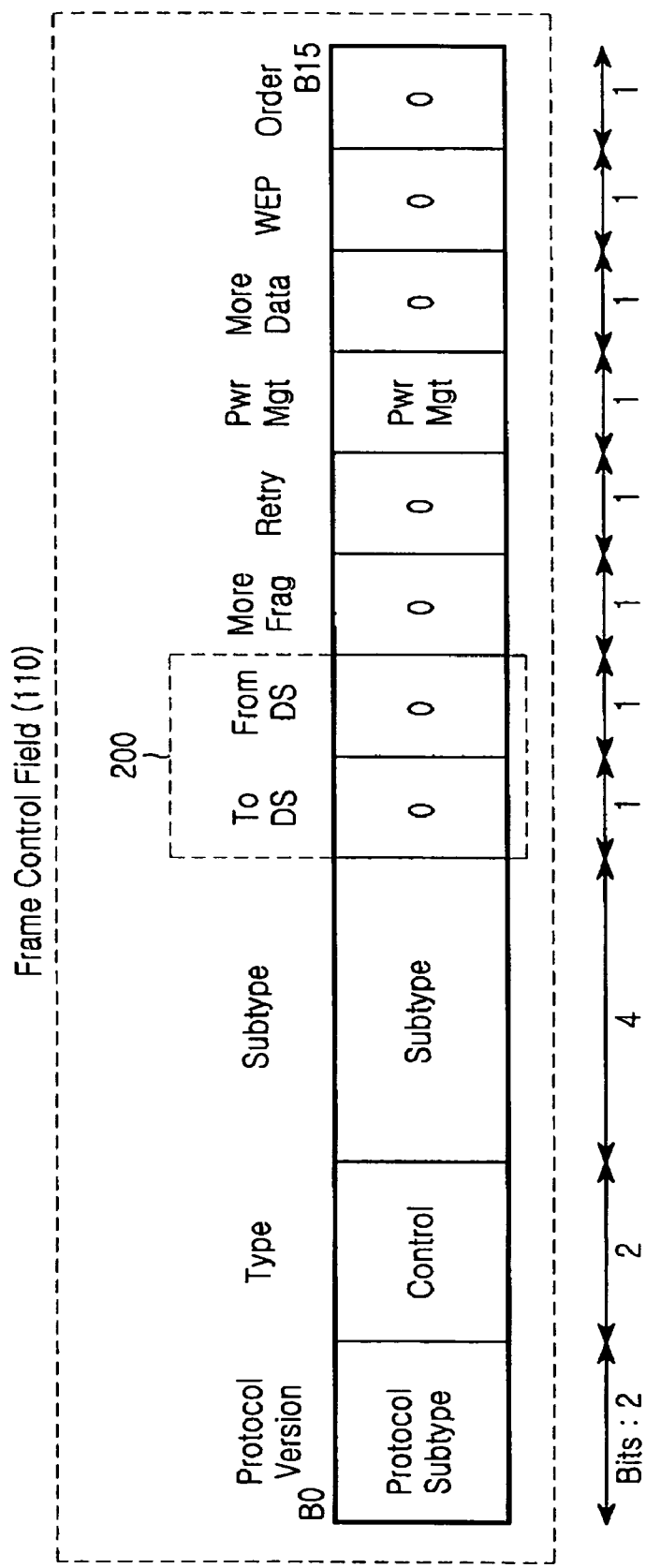
FIG. 2 illustrates the structure of a Frame Control field.

FIG. 2 illustrates the structure of the Frame Control field according to an exemplary embodiment of the present invention. Referring to FIG. 2, a (To DS, From DS) 200 is used in a Frame Control field 110 according to an exemplary embodiment of the present invention. For example, if (To DS, From DS)=(1, 1), a data frame is sent to a Wireless Distribution System (WDS). Unlike data transmission between an STA and an Access Point (AP), WDS transmission data may be created in a plurality of transmitter and receiver pairs. Therefore, simultaneous transmission on multiple channels can increase network throughput. However, only (To DS, From DS)=(0, 0) is available for transmission of a control frame. Hence, it can be indicated that the control frame includes a destination channel information in the Duration field, for transmission of WDS data on a channel other than a current channel by using one of the unused values, such as (To DS, From DS)=(1, 0), (To DS, From DS)=(0, 1) and (To DS, From DS)=(1, 1).

Duration Field

With reference to FIG. 3 to FIG. 6, the Duration field will be described below.

Figure 3:
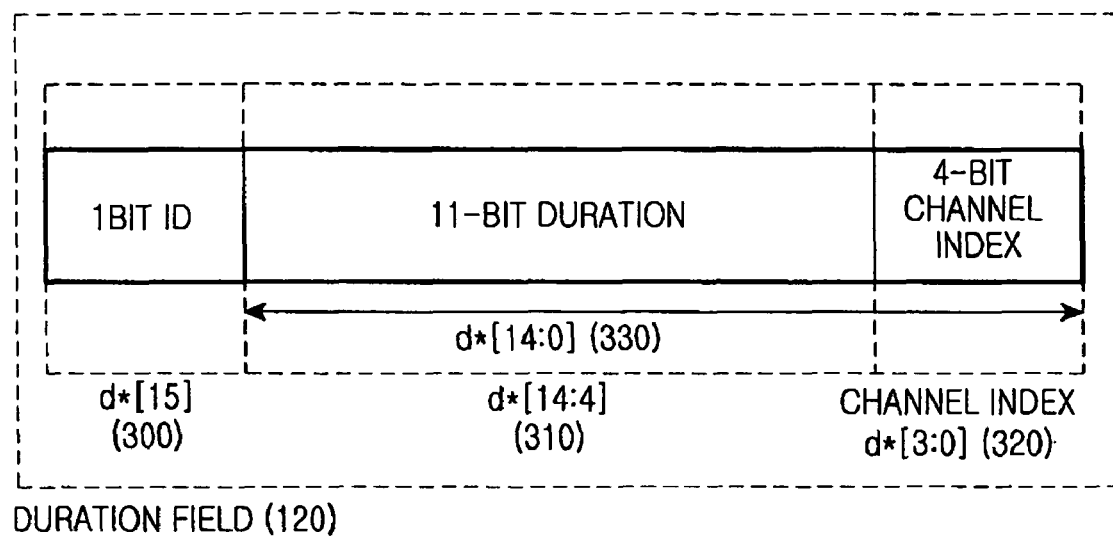
FIG. 3 illustrates the structure of a Duration field according to an exemplary embodiment of the present invention.

FIG. 3 illustrates the structure of the Duration field according to an exemplary embodiment of the present invention. Referring to FIG. 3, a channel index 320 is set in the Duration field 120. The Duration field 120 is 16 bits in length. Four bits of the Duration field 120 are allocated to the channel index 320 according to an exemplary embodiment of the present invention. Since an existing WLAN uses 16 channels or less, 16 channels can be represented in four bits. Thus, data transmission can be carried out on an intended channel by setting a value of the 4-bit channel index 320.

Figure 4:
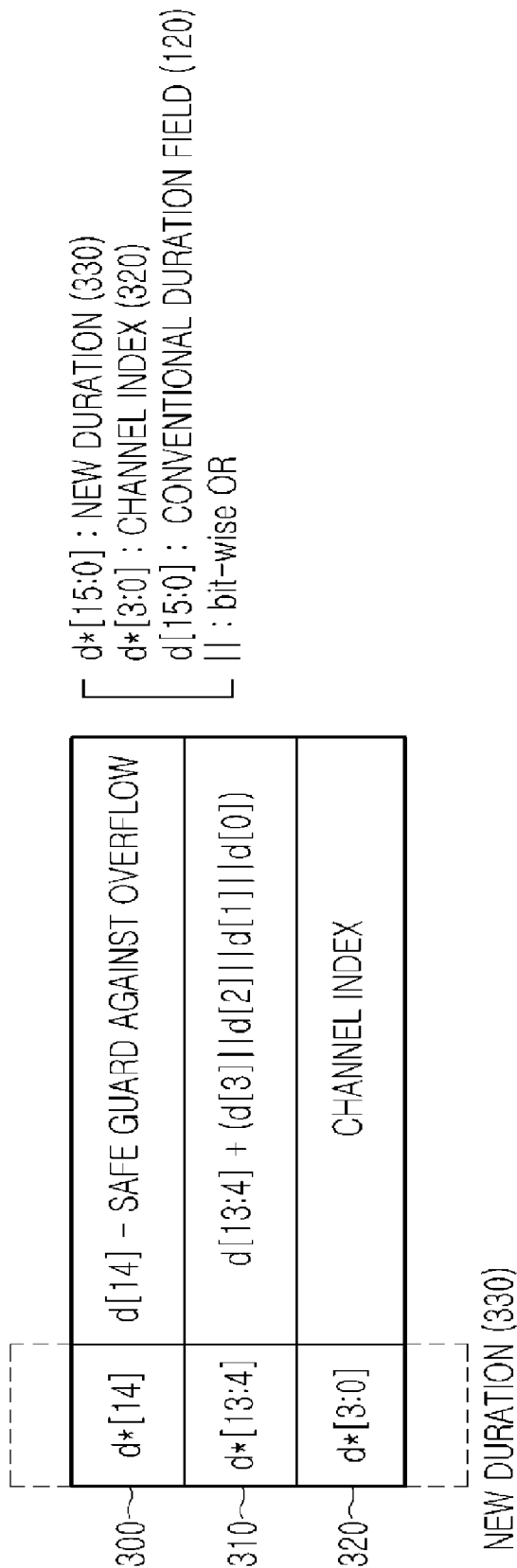
FIG. 4 illustrates the Duration field with a channel duration field set therein according to an exemplary embodiment of the present invention.

FIG. 4 illustrates the Duration field with the channel index set according to an exemplary embodiment of the present invention. Referring to FIG. 4, d[15:0] denotes 16 bits of the existing Duration field 120. The Most Significant Bit (MSB) of the Duration field 120 indicates an Identifier (ID) and the remaining 15 Least Significant Bits (LSBs) indicate an actual duration value. d*[15:0] denotes the new Duration field 120 added with the channel switching functionality. The MSB of d*, d*[15] has the same value as d[15].

d*[14] 300 is the 15$^{th}$ bit equal to d[14]. This provides a "safeguard function against overflow". Truncating the 4 LSBs may effectively reduce the duration, e.g., if the channel index is equal to 0 then d*[3:0] is set to 0. In such a case neighboring WLAN devices allocate a shorter NAV which in turn may result in malfunction. To prevent this malfunction, if any of the 4 LSBs is non-zero, a 1 is added to the d[13:4] as follows; d*[13:4] 310 is updated to "d[13:4]+(d[3]||d[2]||d[1]||d[0])". The new Duration field 120 is modeled by adding d[3]||d[2]||d[1]||d[0] to d[13:4]. "||" represents a bit-wise OR operation.

In an exemplary embodiment of the present invention, d*[3:0] in d[13:0] is allocated as the channel index 320. The channel index 320 is expressed as a binary 4-bit value and thus one of 16 channels can be selected by the channel index 320. Thus, any channel available to the WLAN device can be selected.

Figure 5:
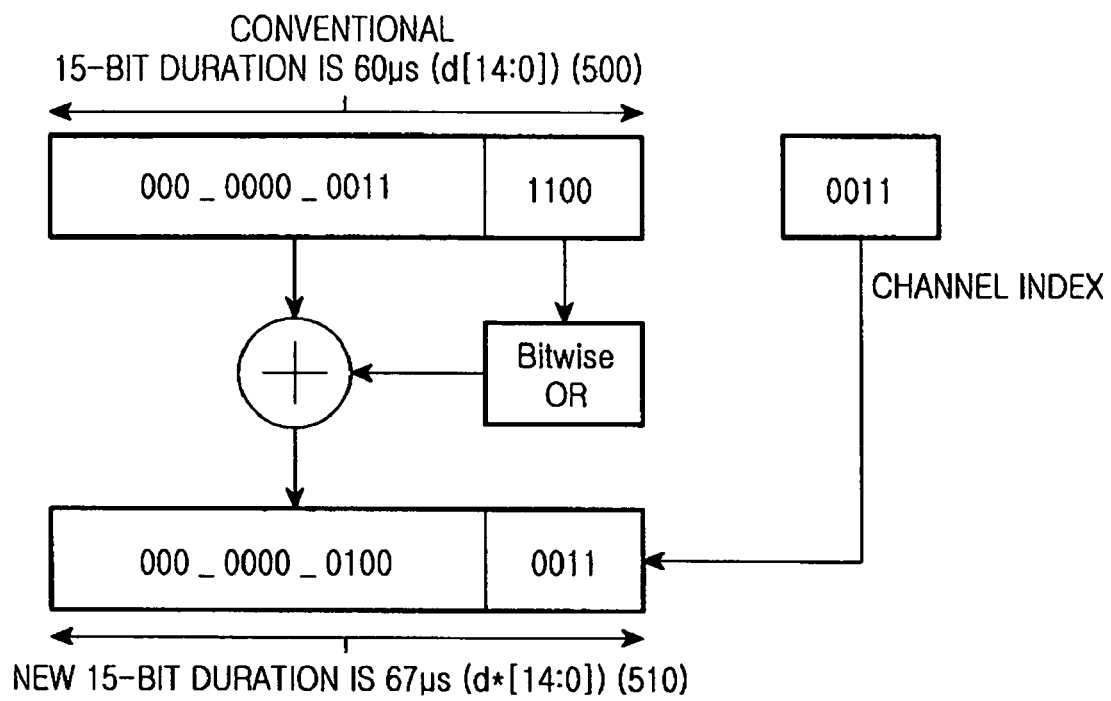
FIG. 5 illustrates calculation of time according to the value of the Duration field according to an exemplary embodiment of the present invention.

FIG. 5 illustrates calculation of time according to the value of the Duration field according to an exemplary embodiment of the present invention. Referring to FIG. 5, when a value of the conventional Duration field 120 is "111100" as indicated by reference numeral 500, the value is expressed as 60 microseconds in time ($=2^5+2^4+2^3+2^2=60$).

For data transmission on channel #3, the channel index 320 is set to "0011" in d*[3:0] in the new Duration field 120 according to an exemplary embodiment of the present invention. To prevent a decrease in the time indicated by the conventional Duration field 120, d[3]||d[2]||d[1]||d[0] is added to d*[14:4]. As a result, the new Duration field 120 has a bit value of "1000011" as indicated by the reference numeral 510. "1000011" indicates 67 microseconds in time ($=2^6+2^2+1=67$).

Figure 6:
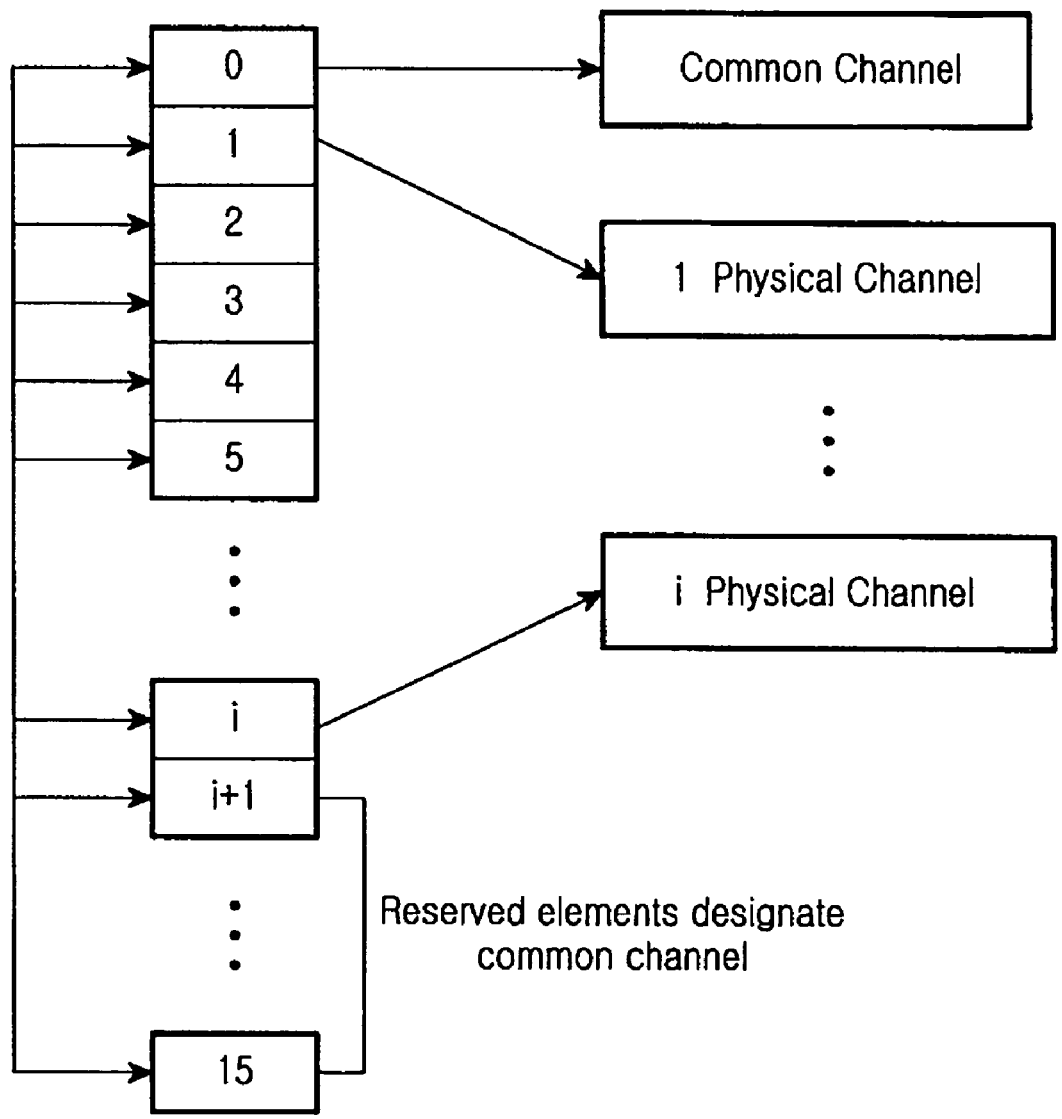
FIG. 6 illustrates mapping between values of the channel index and channels according to an exemplary embodiment of the present invention.

FIG. 6 illustrates mapping between values of the channel index and channels according to an exemplary embodiment of the present invention. Referring to FIG. 6, when the channel index 320 is "0000", it indicates channel #0, a common channel. The common channel is shared among all WLAN devices within the network. For a multi-channel operation using a single channel, the RTS frame and the CTS frame are delivered on the common channel. Channel #1 through channel #i are physical channels on which data is transmitted. If there are i available channels, channel #(i+1) to channel #15 are reserved for future use. If the channel index 320 indicates an unused channel, it is considered to indicate the common channel. Thus, no channel switching takes place.

Embodiment

Figure 7:
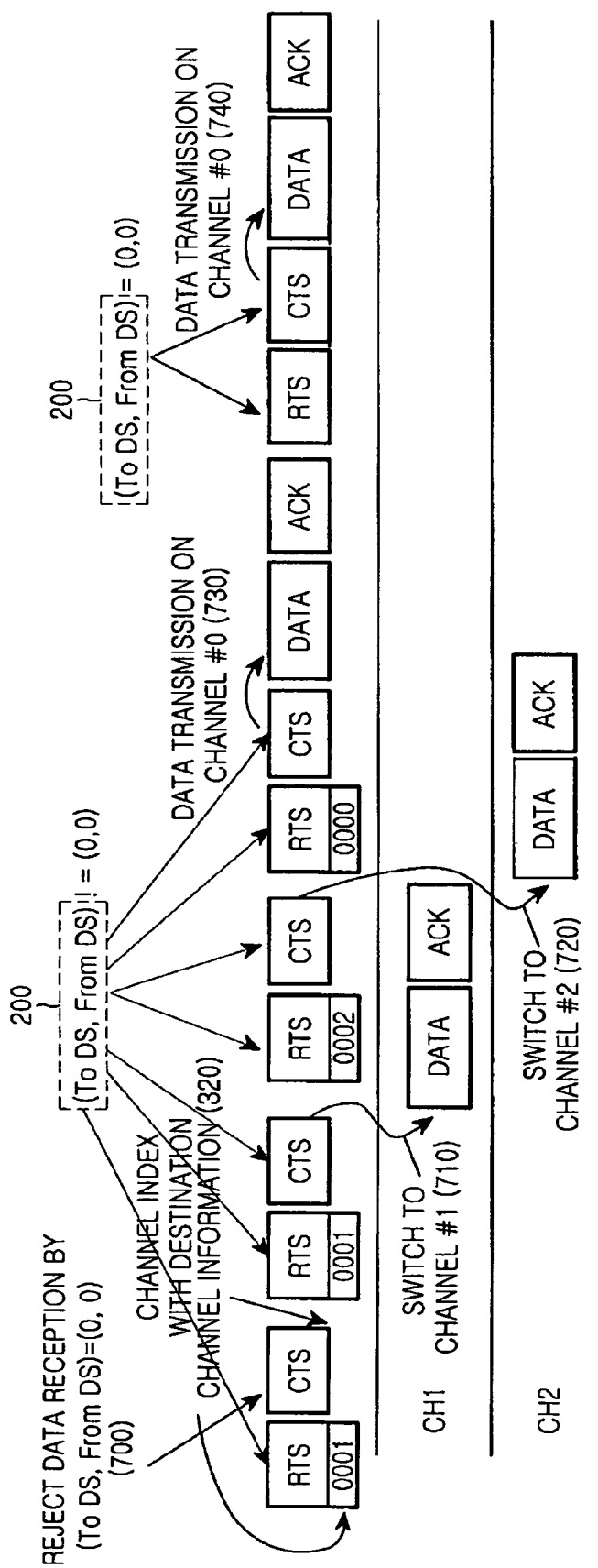
FIG. 7 illustrates a data transmission on a switched channel according to an exemplary embodiment of the present invention.

Channel switching for data transmission and data transmission on a switched channel will be described below with reference to FIG. 7 to FIG. 10. FIG. 7 illustrates a data transmission on a switched channel according to an exemplary embodiment of the present invention.

Upon generation of transmission data, a transmitter initially sends an RTS frame to a receiver. The receiver sends a CTS frame to the transmitter. When data transmission is decided, the transmitter sends the data to the receiver on the switched channel and the receiver replies with an Acknowledge character (ACK).

Reference numeral 700 denotes how the receiver rejects data reception. The receiver rejects the data reception by setting (To DS, From DS)=(0, 0) in the CTS frame. Upon receipt of the CTS frame with (To DS, From DS)=(0, 0), the transmitter cancels the data transmission. In this case, a typical WLAN MAC retransmission procedure is performed.

Reference numeral 710 denotes data transmission on physical channel #1. This is possible by setting the channel index 320 to "0001" in the RTS frame in the transmitter. Reference numeral 720 denotes data transmission on physical channel #2 in the same manner. Reference numeral 730 denotes data transmission on the common channel (channel #0) without channel switching.

Reference numeral 740 denotes data transmission on the common channel in the case where (To DS, From DS)=(0, 0). If (To DS, From DS)=(0, 0), which implies no channel switching, data transmission is performed on the common channel.

Except for the transmitter and the receiver, any other WLAN device which has received the RTS frame or the CTS frame operates in the typical WLAN MAC procedure.

Method of Rejecting Data Reception in Receiver

Figure 8:
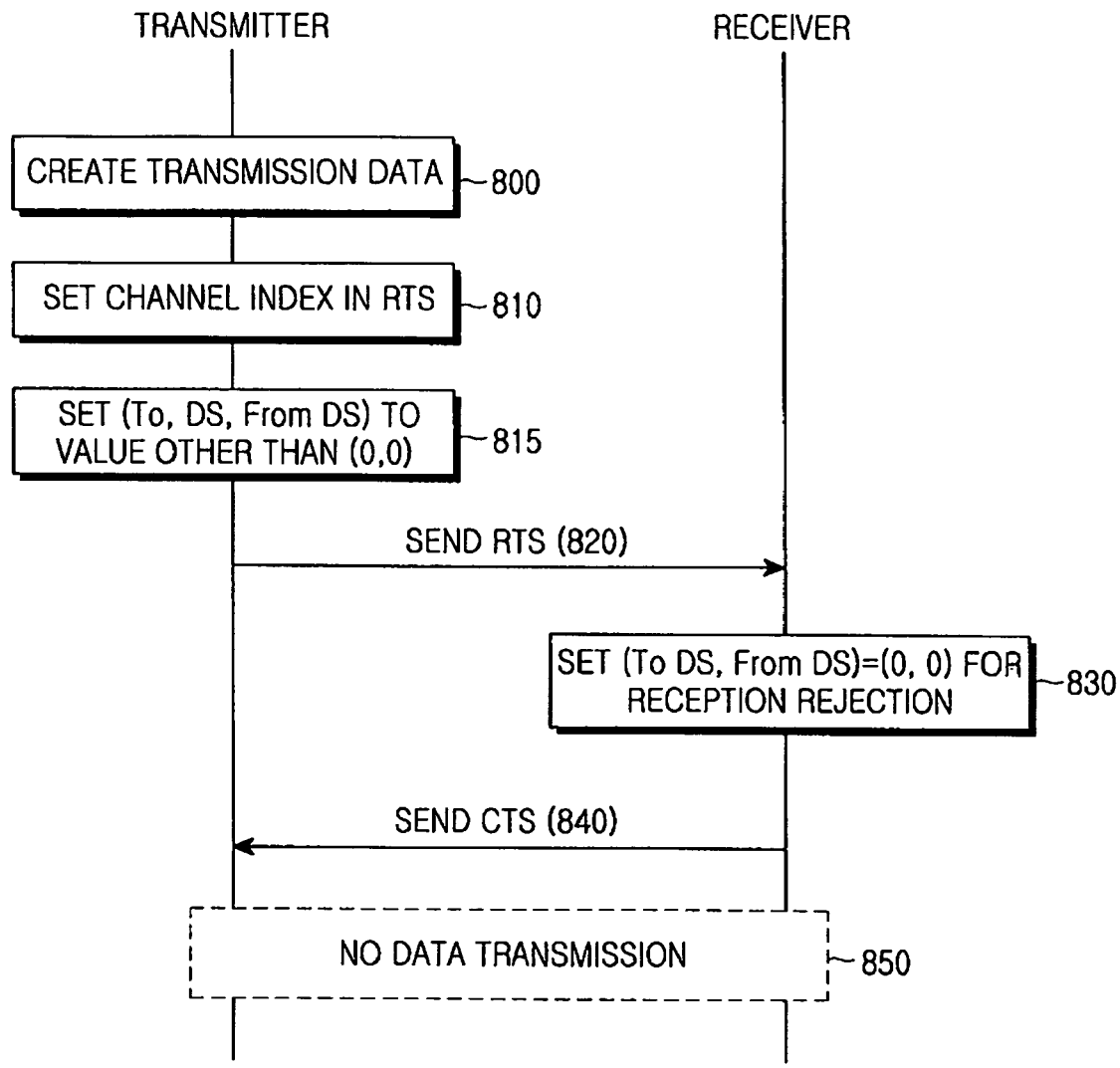
FIG. 8 is a flowchart illustrating an operation for rejecting data reception in a receiver according to an exemplary embodiment of the present invention.

FIG. 8 is a flowchart illustrating an operation for rejecting data reception in the receiver according to an exemplary embodiment of the present invention.

Referring to FIG. 8, the transmitter creates transmission data in step 800 and selects a channel on which to deliver the transmission data by setting a channel index indicating the destination channel in an RTS frame in step 810, and setting (To DS, From DS) to value other than (0, 0) in step 815. In step 820, the transmitter sends the RTS frame to the receiver.

In step 830, the receiver sets (To DS, From DS)=(0, 0) if it wants to reject the data reception. The receiver then sends a CTS frame with (To DS, From DS)=(0, 0) to the transmitter in step 840.

When the transmitter discovers that (To DS, From DS)=(0, 0) in the CTS frame in step 850, channel switching and data transmission do not occur. If there is congestion at the receiver, this data reception rejection method can be used for congestion control.

Method of Transmitting Data on a Switched Channel

Figure 9:
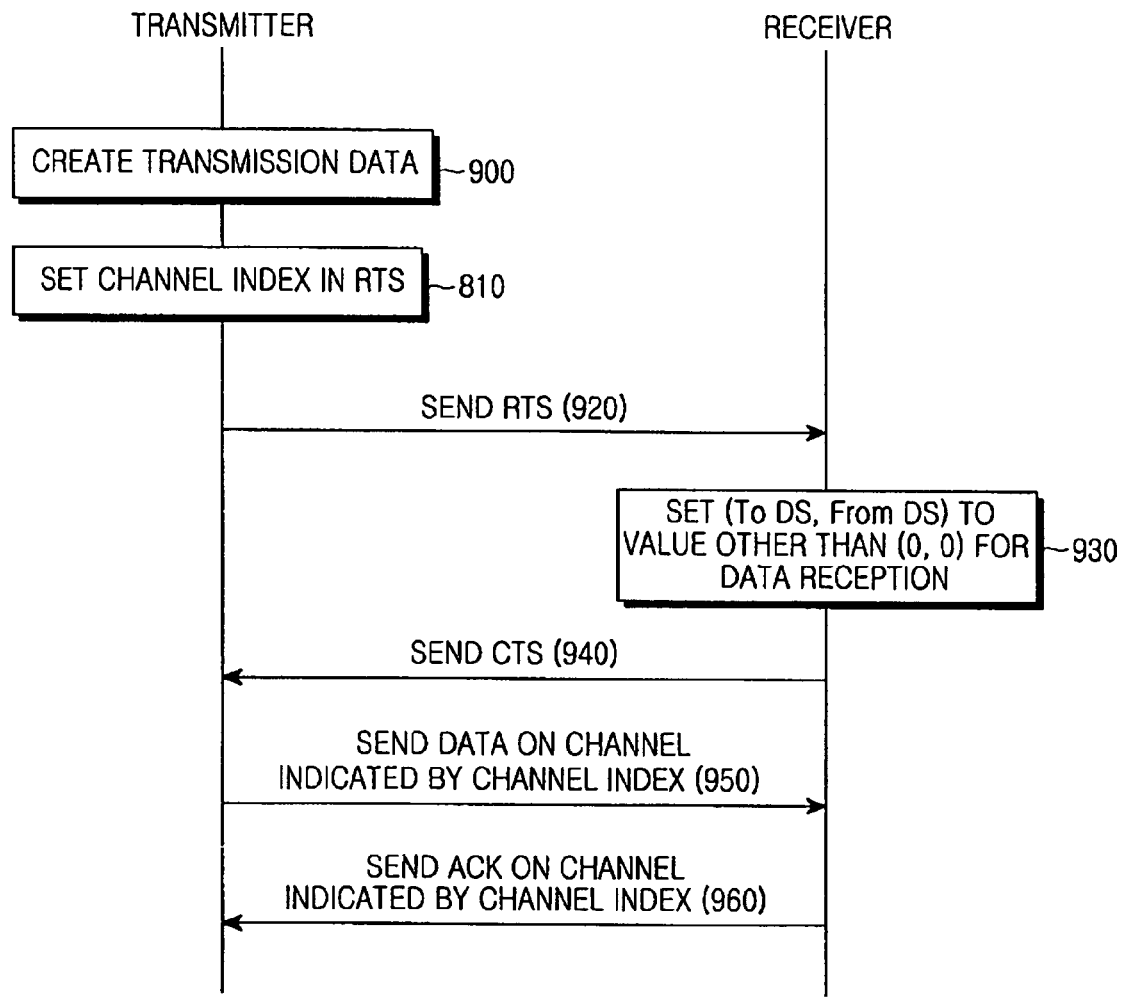
FIG. 9 is a flowchart illustrating an operation for transmitting data on a switched channel according to an exemplary embodiment of the present invention.

FIG. 9 is a flowchart illustrating an operation for transmitting data on a switched channel according to an exemplary embodiment of the present invention.

Referring to FIG. 9, the transmitter creates transmission data in step 900 and sets the channel index 320 to indicate a data transmission channel in an RTS frame in step 910. In step 920, the transmitter sends the RTS frame to the receiver.

In step 930, the receiver sets (To DS, From DS) to a value other than (0, 0) for data reception in a CTS frame. The receiver sends the CTS frame to the transmitter in step 940. Since (To DS, From DS) is not (0, 0), both channel switching and data transmission occur.

In step 950, the transmitter sends the data on the channel indicated by the channel index 320 to the receiver. The receiver replies with an ACK on the channel indicated by the channel index 320 in step 960.

Data Transmission on Common Channel

Figure 10:
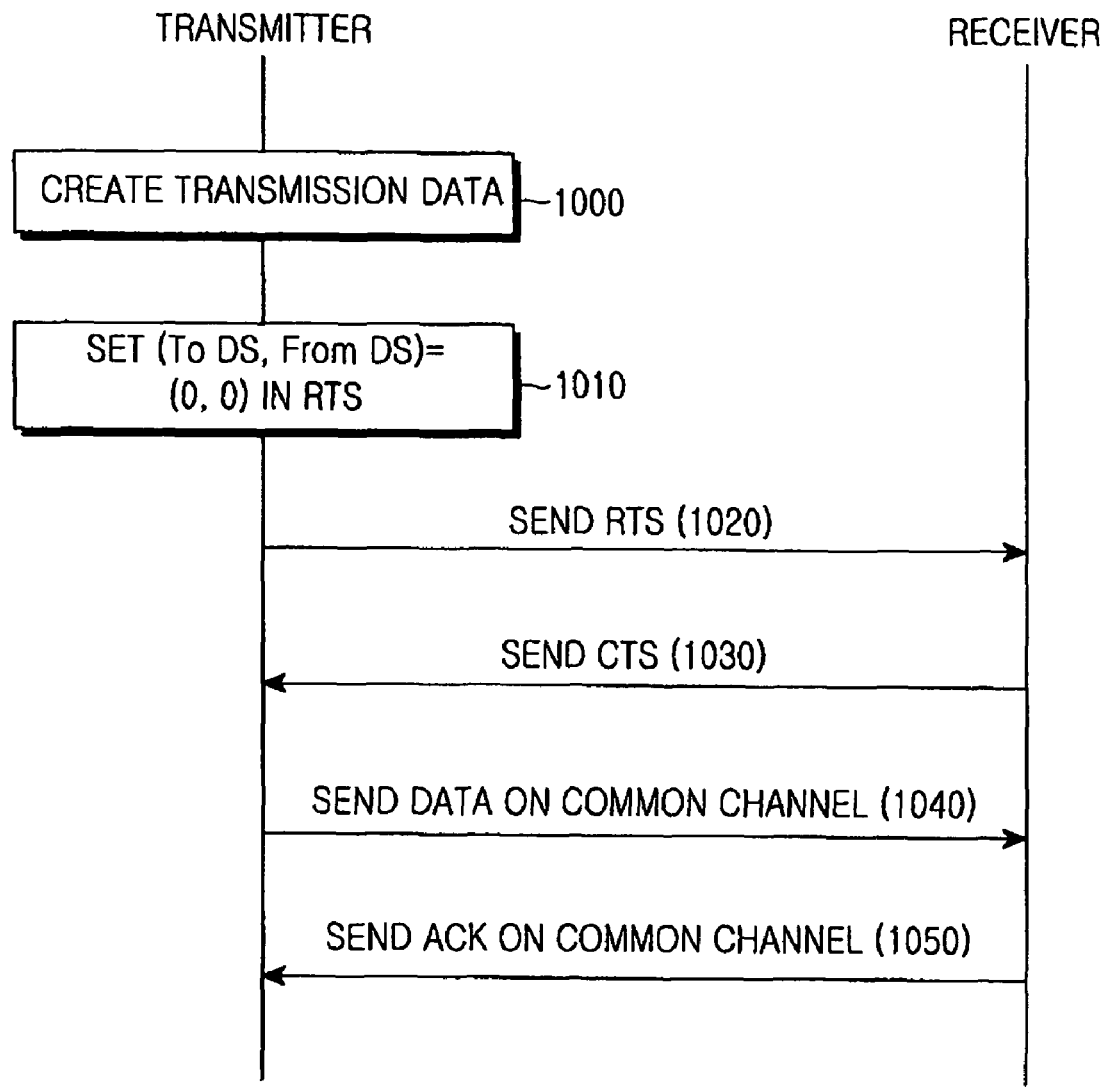
FIG. 10 is a flowchart illustrating an operation for transmitting data on a common channel according to an exemplary embodiment of the present invention.

FIG. 10 is a flowchart illustrating an operation for transmitting data on the common channel according to an exemplary embodiment of the present invention. Since transmission on the common channel does not require channel switching, a typical exchange of RTS and CTS frames in the WLAN is sufficient.

Referring to FIG. 10, the transmitter creates transmission data in step 1000 and sets (To DS, From DS) to (0, 0) in an RTS frame to send data on the common channel in step 1010. In step 1020, the transmitter sends the RTS frame to the receiver. The receiver then sends a CTS frame to the transmitter in step 1030.

In step 1040, the transmitter sends the data on the common channel to the receiver. The receiver replies with an ACK on the common channel in step 1050.

As described above, an exemplary embodiment of the present invention provides the signaling method for channel switching by setting the channel index in the Duration field. Since a data transmission channel to be changed can be set in the RTS frame or the CTS frame, increased network efficiency facilitates quick data transmission channel switching. Also, an existing WLAN device can recognize the switched data transmission channel.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A signaling method for indicating the intention to switch to another channel and prescribing the said channel in a Wireless Local Area Network (WLAN), the method comprising:

allocating a data transmission channel number to a receiver and a transmitter;

setting a channel index in a duration field of a Request-To-Send (RTS) frame to a value of the data transmission channel number to identify another allocated data transmission channel, the RTS frame including a frame control field, the duration field, and a destination address field; and switching a data transmission channel to the another allocated data transmission channel based on the channel index set in the duration field of the frame.

2. The signaling method of claim 1, wherein the allocating comprises allocating the data transmission channel identified by the channel index, when (To DS, From DS) is not (0, 0).

3. The signaling method of claim 1, wherein the setting comprises setting the channel index to a 4-bit value identifying the another allocated data transmission channel in a duration field.

4. The signaling method of claim 1, wherein the duration field comprises the following configuration:

$d^*[15]=d[15]$-ID Field $d^*[14]=d[14]$: safe guard against overflow $d^*[13:4]=d[13:4]+(d[3]\|d[2]\|d[1]\|d[0])$ $d^*[3:0]=$channel switching information where $d^*[15]$ denotes a new duration field and $d^*[3:0]$ denotes the channel index.

5. The signaling method of claim 1, further comprising setting a Network Allocation Vector (NAV) according to the values of the channel index and the value of the duration field in a transmitter, a receiver, and an adjacent node.

6. The signaling method of claim 1, wherein the allocating comprises allocating the data transmission channel identified by the channel index, when a bit (or bits) in the frame control field of a control frame is set in a predetermined manner with an aim to facilitate indication of the said data transmission channel.

7. A signaling method for channel switching in a transmitter in a Wireless Local Area Network (WLAN), the method comprising:

setting a channel index in a duration field of a Request to Send (RTS) frame to a value of a data transmission channel number to identify another allocated data transmission channel, the RTS frame including a frame control field, the duration field, and a destination address field;

transmitting the RTS frame including the duration field to a receiver; and switching a data transmission channel to the another allocated data transmission channel based on the channel index set in the duration field of the frame.

8. The signaling method of claim 7, further comprising: receiving a Clear-To-Send (CTS) frame from the receiver; transmitting data on the another data transmission channel identified by the channel index, if (To DS, From DS) is not (0, 0) in the CTS frame; and
receiving an Acknowledge character (ACK) on the another data transmission channel identified by the channel index.

9. The signaling method of claim 7, further comprising: receiving a CTS frame from the receiver; and
retransmitting the RTS frame without channel switching, if (To DS, From DS) is (0, 0) in the CTS frame.

10. The signaling method of claim 7, further comprising: receiving a Clear-To-Send (CTS) frame from the receiver; transmitting data on the another data transmission channel identified by the channel index, if a bit (or bits) in the frame control field of a control frame is set in a predetermined manner with an aim to facilitate indication of the said data transmission channel.

11. A signaling method for channel switching in a receiver in a Wireless Local Area Network (WLAN), the method comprising:
receiving a Request-To-Send (RTS) frame from a transmitter, the RTS frame including a frame control field, a duration field, a destination address field, and a channel index included in the duration field and set to a value of a data transmission channel number to identify another allocated data transmission channel;
setting a Clear-To-Send (CTS) frame to indicate whether channel switching is to be performed;
transmitting the CTS frame to the transmitter; and
switching a data transmission channel to the another allocated data transmission channel based on the channel index set in the duration field of the frame.

12. The signaling method of claim 11, wherein the setting comprises setting (To DS, From DS) to a value other than (0, 0) in the CTS frame, if the receiver wants to receive data on another allocated data transmission channel identified by the channel index in the RTS frame.

13. The signaling method of claim 11, further comprising: receiving the data on the another allocated data transmission channel identified by the channel index from the transmitter; and
transmitting an Acknowledge character (ACK) on the another allocated data transmission channel identified by the channel index to the transmitter.

14. The signaling method of claim 11, wherein the setting comprises setting (To DS, From DS) to (0, 0) in the CTS frame, if the receiver rejects data reception.

15. A wireless local area network comprising:
a transmitter for transmitting a Request-To-Send (RTS) frame by setting a channel index in a duration field of the RTS frame to a value of a data transmission channel number to identify another allocated data transmission channel, the RTS frame including a frame control field, the duration field, and a destination address field; and
a receiver for receiving an RTS frame from the transmitter, wherein the transmitter and the receiver switch to the another allocated data transmission channel based on the channel index set in the duration field of the frame.

16. The wireless local area network of claim 15, wherein the transmitter transmits the RTS frame comprising the modified duration field to the receiver.

17. The wireless local area network of claim 15, wherein the receiver sets a Clear To Send (CTS) frame as an indication of whether channel switching is to be performed and transmits the CTS frame to the transmitter.

18. The wireless local area network of claim 15, wherein the transmitter creates transmission data and sets the channel index to indicate a data transmission channel number in an RTS frame.

19. The wireless local area network of claim 15, wherein the receiver sets (To DS, From DS) to a value that does not equal (0,0) for data reception in a CTS frame and the receiver sends the CTS frame to the transmitter.

20. The wireless local area network of claim 15, wherein the receiver sets (To DS, From DS) to (0,0) in a CTS frame.

21. The wireless local area network of claim 20, wherein the receiver sends the CTS frame to the transmitter.

* * * * *